(12) United States Patent
Schütze et al.

(10) Patent No.: US 6,642,303 B2
(45) Date of Patent: Nov. 4, 2003

(54) POLYURETHANE-POLYUREA DISPERSIONS AS COATING COMPOSITIONS

(75) Inventors: Detlef-Ingo Schütze, Odenthal (DE); Gerald Kurek, Leverkusen (DE); Thorsten Rische, Unna (DE); Jürgen Urban, Köln (DE); Tillmann Hassel, Pulheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/140,322

(22) Filed: May 6, 2002

(65) Prior Publication Data

US 2003/0105219 A1 Jun. 5, 2003

(30) Foreign Application Priority Data

May 9, 2001 (DE) .......................................... 101 22 444

(51) Int. Cl.[7] .............................. C08J 3/00; C08K 3/20; C08L 75/00; B32B 27/00; B32B 27/40
(52) U.S. Cl. .................... 524/589; 428/423.1; 524/590; 524/591; 524/839; 524/840
(58) Field of Search ................................ 524/591, 839, 524/840, 589, 590; 428/423.1

(56) References Cited

U.S. PATENT DOCUMENTS

| 3,900,688 | A | * | 8/1975 | Thoma et al. ............... 428/246 |
| 4,092,286 | A | * | 5/1978 | Noll et al. ........... 260/29.2 TN |
| 4,108,814 | A | * | 8/1978 | Reiff et al. .......... 260/29.2 TN |
| 4,237,264 | A | * | 12/1980 | Noll et al. ..................... 528/67 |
| 4,238,378 | A | * | 12/1980 | Markusch et al. ... 260/29.2 TN |
| 4,293,474 | A | * | 10/1981 | Dieterich et al. .... 260/29.2 TN |
| 4,303,774 | A | * | 12/1981 | Nachtkamp et al. .......... 528/71 |

FOREIGN PATENT DOCUMENTS

| DE | 198 12 751 A1 | * | 10/1999 |
| EP | 0 219 677 | * | 4/1987 |
| EP | 0 837 083 A2 | * | 4/1998 |

* cited by examiner

*Primary Examiner*—Patrick D. Niland
(74) *Attorney, Agent, or Firm*—Joseph C. Gil; Thomas W. Roy; Gary F. Matz

(57) ABSTRACT

The invention concerns ionic and/or non-ionic hydrophilic, aqueous polyurethane-polyurea dispersions (PU dispersions) based on polycarbonate polyols and polytetramethylene glycol polyols, a process for their production and their use as coating compositions, in particular for the production of very stable thick foam deposits in a single coat.

15 Claims, No Drawings

POLYURETHANE-POLYUREA DISPERSIONS AS COATING COMPOSITIONS

BACKGROUND OF THE INVENTION

The invention relates to novel aqueous polyurethane-polyurea dispersions based on polycarbonate polyols and polytetramethylene glycol polyols, a process for their production and their use as coating compositions, in particular for flexible substrates such as textiles and leather.

In the coating of flexible substrates, in particular textiles and leather, solvent-containing systems are increasingly replaced by low-solvent or solvent-free aqueous systems. The properties required of textile and leather coating systems consist above all in a high resistance to chemicals and water, high mechanical resistance and high tensile strength and extensibility. These requirements are largely fulfilled by polyurethane-polyurea dispersions of the prior art, such as are described for example in DE-A 24 46 440, DE-A 25 51 094, DE-A 26 51 505, DE-A 26 51 506, DE-A 26 59 617 and DE-A 28 16 815. The systems cited therein are self-emulsifying due to hydrophilic groups and can be dispersed in water without the aid of external emulsifiers.

Polyurethane-polyurea dispersions, referred to below as PU dispersions, are used today in a growing number of sectors, which means that the resulting coatings have to satisfy very diverse ranges of requirements. Thus for the coating of flexible substrates, for example textiles and leather, in addition to the properties mentioned above, properties such as the attainment of thick deposits in a single coat or the production of stable foams are also desirable. The processing steps in the overall coating process can be rationalized and the associated production costs reduced in this way. Furthermore, properties such as good hydrolysis resistance combined with high folding endurance, scratch resistance and abrasion resistance should also be achieved.

It was an object of the present invention to provide alternative PU dispersions as coating compositions for flexible substrates, which meet the requirements of PU dispersions of the prior art but also display the above-mentioned properties.

It has been found that ionic and/or non-ionic hydrophilic, aqueous PU dispersions based on polycarbonate polyols and polytetramethylene glycol polyols allow coatings with the range of properties mentioned above to be produced on substrates. The coatings according to the invention display improved foaming characteristics, high abrasion resistance and extremely high folding endurance, scratch resistance and hydrolysis resistance.

SUMMARY OF THE INVENTION

The invention relates to an ionic and/or non-ionic hydrophilic, aqueous polyurethane (PU) dispersion containing A1 a polyisocyanate,
A2 a mixture of a polycarbonate and a polytetramethylene glycol polyol,
A3 optionally a monoalcohol or a monoamine,
A4 a polyol, an amino polyol or a polyamine,
A5 optionally a polyoxyalkylene ether with at least one hydroxyl or amino group, and
A6 optionally an antioxidant and/or a light stabilizer and/or another auxiliary substance and/or an additive.

DETAILED DESCRIPTION OF THE INVENTION

In a preferred embodiment the invention relates to PU dispersions containing

A1. 5 to 30 wt. %, more preferred 10 to 25 wt. % and most preferred 13 to 20 wt. % of a polyisocyanate,
A2. 55 to 87 wt. %, more preferred 60 to 85 wt. % and most preferred 70 to 82 wt. % of a mixture of a polycarbonate and a polytetramethylene glycol polyol,
A3. 0 to 10 wt. % of a monoalcohol or monoamine,
A4. 1 to 20 wt. %, more preferred 1 to 15 wt. % and most preferred 1 to 10 wt. % of a polyol, aminopolyol or polyamine,
A5. 0 to 10 wt. %, more preferred 1 to 10 wt. % and most preferred 1 to 5 wt. %, of a polyoxyalkylene ether with at least one hydroxyl or amino group, and
A6. 0 to 10 wt. %, more preferred 0.5 to 8 wt. % and most preferred 1 to 6 wt. %, of antioxidants and/or light stabilizers and/or other auxiliary substances and additives, whereby the sum of the percentages by weight of components A1 to A6 is 100%.

Suitable diisocyanates (A1) include those having a number average molecular weight of 140 to 400 with aliphatically, cycloaliphatically, araliphatically and/or aromatically bonded isocyanate groups. Examples include 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl) cyclohexane, 1-isocyanato-3,3,5-trimethyl-5-isocyanatomethyl cyclohexane (isophorone diisocyanate, IPDI), 4,4'-diisocyanatodi-cyclohexyl methane, 1-isocyanato-1-methyl-4(3)isocyanatomethyl cyclohexane, bis(isocyanatomethyl) norbornane, 1,3- and 1,4-bis(2-isocyanatoprop-2-yl) benzene (TMXDI), 2,4- and 2,6-diisocyanatotoluene (TDI), 2,4'- and 4,4'-diisocyanatodiphenyl methane, 1,5-diisocyanato-naphthaline or any blends of such diisocyanates.

Polyisocyanates or polyisocyanate blends with exclusively aliphatically and/or cycloaliphatically bonded isocyanate groups are preferred. More preferred starting components (A1) include polyisocyanates or polyisocyanate blends based on HDI, IPDI and/or 4,4'-diisocyanatodicyclohexyl methane.

Also suitable as polyisocyanates (A1) are any polyisocyanates produced by modification of simple aliphatic, cycloaliphatic, araliphatic and/or aromatic diisocyanates, based on at least two diisocyanates and having a uretdione, isocyanurate, urethane, allophanate, biuret, imino-oxadiazine dione and/or oxadiazine trione structure, including those described in J. Prakt. Chem. 336 (1994) 185–200, DE-A-1 670 666, DE-A-1 954 093, DE-A-2 414 413, DE-A-2 452 532, DE-A-2 641 380, DE-A-3 700 209, DE-A-3 900 053 and DE-A-3 928 503 or EP-A-0 336 205, EP-A-0 339 396 and EP-A-0 798 299, for example.

Component (A2) of the PU dispersions according to the invention contain a mixture of polycarbonate polyols and polytetramethylene glycol polyols. The proportion of polycarbonate polyols in the mixture is between 20 and 80 wt. %, the proportion of polytetramethylene glycol polyols is between 80 and 20 wt. %. A proportion of 30 to 75 wt. % of polytetramethylene glycol polyols and a proportion of 25 to 70 wt. % of polycarbonate polyols is preferred. A proportion of 35 to 70 wt. % of polytetramethylene glycol polyols and a proportion of 30 to 65 wt. % of polycarbonate polyols is more preferred, with the proviso in each case that the sum of the percentages by weight of polycarbonate and polytetramethylene glycol polyols is 100%.

The number-average molecular weight range of the polymeric polyols (A2) is between 400 and 6000. Suitable polymeric polyols (A2) include polyethers, polycarbonates and polyester carbonates having an OH functionality of at least 1.8 to 4. Polyols in a number-average molecular weight range of 600 to 4000 having an OH functionality of 2 to 3 are preferred. Polyols with average molecular weight ranges of 800 to 2500 are more preferred.

Suitable polycarbonates can be obtained by reaction of carbon acid derivatives, e.g. diphenyl carbonate, dimethyl carbonate or phosgene with diols. Suitable examples of such diols include ethylene glycol, 1,2- and 1,3-propanediol, 1,3- and 1,4-butanediol, 1,6-hexanediol, 1,8-octanediol, neopentyl glycol, 1,4-bishydroxymethyl cyclohexane, 2-methyl-1,3-propanediol, 2,2,4-trimethyl pentanediol-1,3, dipropylene glycol, polypropylene glycols, dibutylene glycol, polybutylene glycols, bisphenol A, tetrabromobisphenol A as well as lactone-modified diols. The diol component preferably contains 40 to 100 wt. % hexanediol, preferably 1,6-hexanediol and/or hexanediol derivatives. More preferably the diol component includes examples that in addition to terminal OH groups display ether or ester groups, e.g. products obtained by reaction of 1 mol hexanediol with at least 1 mol, preferably 1 to 2 mol caprolactone according to DE-A 1770245, or by etherification of hexanediol with itself to form dihexylene or trihexylene glycol. The production of such derivatives is known from DE-A 15 70 540, for example. The polyether polycarbonate diols described in DE-A 3717060 can also be used.

The hydroxyl polycarbonates should be substantially linear. However, they can optionally be slightly branched by the incorporation of polyfunctional components, in particular low-molecular polyols. Suitable examples include glycerol, trimethylol propane, hexanetriol-1,2,6, butanetriol-1,2,4, trimethylol propane, pentaerythritol, quinitol, mannitol, and sorbitol, methyl glycoside, 1,3,4,6-dianhydrohexites.

Suitable polyether polyols include the polytetramethylene glycol polyethers known in polyurethane chemistry, which can be produced e.g. via polymerization of tetrahydrofuran by cationic ring opening, as described for example in DE-A 741 476.

Monofunctional alcohols (A3) and monoamines can be optionally used for termination of the polyurethane prepolymer. Preferred monoalcohols (A3) include aliphatic monoalcohols with 1 to 18 C atoms, such as ethanol, n-butanol, ethylene glycol monobutyl ether, 2-ethylhexanol, 1-octanol, 1-dodecanol, or 1-hexadecanol. Preferred monoamines (A3) inlcude aliphatic monoamines, such as diethylamine, dibutylamine, ethanolamine, N-methyl ethanolamine or N,N-diethanolamine.

The polyols, aminopolyols or aliphatic, cycloaliphatic and araliphatic polyamines (A4) contained in the PU dispersions according to the invention have amolecular weight below 400 and can be used as chain extenders.

Preferred components (A4) include:
a) alkane diols, such as ethanediol, 1,2- and 1,3-propanediol, 1,4-butanediol, 2,3-butanediol, 1,5-pentanediol, 1,3-dimethyl propanediol, 1,6-hexanediol, neopentyl glycol, cyclohexane dimethanol, 2-methyl-1,3-propanediol,
b) ether diols, such as diethylene diglycol, triethylene glycol or hydroquinone dihydroxyethyl ether,
c) ester diols of formulae (I) and (II),

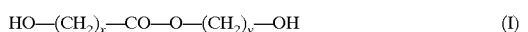

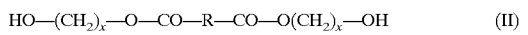

in which
R is an alkylene or arylene radical with 1 to 10 C atoms, preferably 2 to 6 C atoms,
x is 2 to 6 and
y is 3 to 5,
such as δ-hydroxybutyl-ε-hydroxyhexanoic acid ester, ω-hydroxyhexyl-γ-hydroxybutanoic acid ester, adipic acid-(β-hydroxyethyl) ester and terephthalic acid bis (β-hydroxyethyl) ester, and d) polyamines such as ethylene diamine, 1,2- and 1,3-diaminopropane, 1,4-diaminobutane, 1,6-diaminohexane, isophorone diamine, isomer mixture of 2,2,4- and 2,4,4-trimethyl hexamethylene diamine, 2-methyl pentamethylene diamine, diethylene triamine, 1,3- and 1,4-xylylene diamine, α,α,α',α'-tetramethyl-1,3- and -1,4-xylylene diamine and 4,4-diaminodicyclohexyl methane. Also to be considered as diamines in the sense of the invention are hydrazine, hydrazine hydrate and substituted hydrazines, such as N-methyl hydrazine, N,N'-dimethyl hydrazine and homologues thereof, as well as acid dihydrazides, adipic acid, β-methyl adipic acid, sebacic acid, hydracrylic acid and terephthalic acid, semicarbazidoalkylene hydrazides, such as β-semicarbatidopropanoic acid hydrazide (DE-A 17 70 591), semicarbazidoalkylene carbazine esters, such as 2-semicarbazidoethyl carbazine ester (DE-A 1918504) or aminosemicarbazide compounds, such as β-aminoethyl semi-carbazidocarbonate (DE-A 19 02 931).

Polyether polyols and polyester polyols having an average molecular weight above 400 can also be used as polyols, aminopolyols or aliphatic, cycloaliphatic and araliphatic polyamines (A4).

Suitable polyether polyols are polyethers known in polyurethane chemistry, such as polyols of styrene oxide, propylene oxide, butylene oxides or epichlorohydrin, particularly of propylene oxide, produced using starter molecules.

Examples of suitable polyester polyols include reaction products of polyhydric, preferably dihydric and optionally additionally trihydric alcohols with polybasic, preferably dibasic carboxylic acids. The corresponding polycarboxylic anhydrides or corresponding polycarboxylic acid esters of low alcohols or mixtures thereof can also be used in place of the free polycarboxylic acids to produce the polyesters. The polycarboxylic acids can be aliphatic, cycloaliphatic, aromatic and/or heterocyclic polycarboxylic acids and optionally substituted, e.g. by halogen atoms, and/or saturated or unsaturated.

The hydroxy components (A3) and (A4) can contain double bonds, which can be derived for example from long-chain aliphatic carboxylic acids or fatty alcohols. A functionalisation with olefinic double bonds is possible, e.g. by the incorporation of allylic groups or acrylic acid or methacrylic acid and esters thereof.

Components (A3) and (A4), which contain an ionic group or are capable of forming an ionic group, such as dihydroxycarboxylic acids, diaminocarboxylic acids, dihydroxysulfonic acids and diaminosulfonic acids and their salts such as dimethylol propanoic acid, hydroxypivalic acid, 2-(2-aminoethylamino) ethane sulfonic acid, ethylene diamine propyl butyl sulfonic acid, 1,2- or 1,3-propylene diamine-β-ethyl sulfonic acid, lysine, 3,5-diaminobenzoic acid and alkali and/or ammonium salts thereof; the adduct of sodium bisulfate to butene-2-diol-1,4, polyether sulfonate, the propoxylated adduct of 2-butenediol and NaHSO₃ (DE-A 24 46 440) and structural units capable of conversion to cationic groups, such as N-methyl diethanolamine. Preferred components (A3) and (A4) include those having carboxy or carboxylate and/or sulfonate groups.

Preferred PU dispersions according to the invention contain one or more compounds (A3) and/or (A4).

The PU dispersions according to the invention can contain hydrophilic polyoxyalkylene ethers (A5) having at least one hydroxyl or amino group in quantities of 0 to 10 wt. % relative to the solids content of the PU dispersion to support the dispersive action. These polyethers contain a high proportion (approx. 30 wt. % to 100 wt. %) of structural elements derived from ethylene oxide, e.g. ethoxylated monohydric alcohols or ethoxylated phenols. Suitable examples include linear polyethers with a functionality between 1 and 3 but also compounds having formula III,

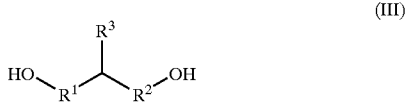

(III)

in which $R^1$ and $R^2$ mutually independently represent a divalent aliphatic, cycloaliphatic or aromatic radical having 1 to 18 C atoms, which can be interrupted by oxygen and/or nitrogen atoms, and $R^3$ represents a non-hydroxy-terminated polyester or preferably polyether. $R^3$ more preferably represents an alkoxy-terminated polyethylene oxide radical.

Suitable additives (A6) known for polyurethanes and polyurethane dispersions and described for example in "Lichtschutzmittel für Lacke" (A. Valet, Vincentz Verlag, Hanover, 1996) and "Stabilization of Polymeric Materials" (H. Zweifel, Springer Verlag, Berlin, 1997) can optionally be used as light stabilizers and antioxidants. Preferred stabilizers are sterically hindered phenols (phenolic antioxidants) and/or sterically hindered amines based on 2,2,6,6-tetramethylene piperidine (hindered amine light stabilizers, HALS light stabilizers). Irganox 1010 (Ciba Spezialitaten GmbH, Lampertheim, Del.) and/or Tinuvin 765 (Ciba Spezialitaten GmbH, Lampertheim, Del.) are particularly preferred. The PU dispersions according to the invention can also contain other auxiliary substances and additives known for PU dispersions, such as emulsifiers, defoaming agents, thickeners. Finally fillers, plasticizers, pigments, carbon black and silica sols, aluminium, clay and asbestos dispersions can also be incorporated into the PU dispersions according to the invention.

The solids content of the PU dispersions according to the invention is between 10 and 70%. They preferably exhibit a solids content of 35 to 70% and particularly preferably 50 to 60%.

The invention also relates to a process for the production of the ionic and/or non-ionic hydrophilic, aqueous PU dispersions according to the invention comprising first reacting components A1 and A2 and optionally components A3 to A6 to form a polyurethane prepolymer, then dispersing the polyurethane prepolymer in or by addition of water and then optionally reacted with A3 to A6.

The aqueous polyurethane dispersions according to the invention can be produced by methods of the prior art (e.g. Houben-Weyl, Erweiterungs- und Folgebände zur 4. Auflage, Vol. E20, H. Bartl and J. Falb, Stuttgart, New York, Thieme 1987, p.1659–1693 or D. Dieterich, Prog. Org. Coatings 9, 281 (1981)).

The NCO/OH ratio in the production of the prepolymers is between 1.2 and 2.8/1, preferably between 1.4 and 2.5/1, particularly preferably between 1.6 and 2.3/1 and most particularly preferably between 1.7 and 2.2/1.

In the first step of the process according to the invention components A1 and A2 and optionally components A3 to A6 are reacted to a PU dispersion, optionally with the aid of an organic solvent.

Suitable solvents include the known paint solvents, such as ethyl acetate, butyl acetate, 1-methoxypropyl-2-acetate, 3-methoxy-n-butyl acetate, acetone, 2-butanone, 4-methyl-2-pentanone, cyclohexanone, toluene, xylene, chlorobenzene or white spirit. Mixtures containing above all more highly substituted aromatics, such as those commercially available under the names solvent naphtha, Solvesso (Exxon Chemicals, Houston, USA), Cypar (Shell Chemicals, Eschborn, Del.), Cyclo Sol (Shell Chemicals, Eschborn, Del.), Tolu Sol (Shell Chemicals, Eschborn, Del.), Shellsol (Shell Chemicals, Eschborn, Del.), are likewise suitable. Other solvents are for example carbonic acid esters, such as dimethyl carbonate, diethyl carbonate, 1,2-ethylene carbonate and 1,2-propylene carbonate, lactones, such as β-propiolactone, γ-butyrolactone, ε-caprolactone, ε-methyl caprolactone, propylene glycol diacetate, diethylene glycol dimethyl ether, dipropylene glycol dimethyl ether, diethylene glycol ethyl and butyl ether acetate, N-methyl pyrrolidone and N-methyl caprolactam, or any blends of such solvents.

In a further step groups capable of neutralisation are converted to the salt form and the dispersion produced with water. Depending on the degree of neutralisation and the content of ionic groups, the dispersion can be formulated to have a very fine-particle character, such that it has the appearance of a solution. Coarse-particle formulations, which are likewise sufficiently stable, are also possible, however. The solvent that is optionally used can be removed by distillation following dispersion.

All methods known from the prior art, such as emulsifier shear force, acetone, prepolymer mixing, melt emulsification, ketimine and spontaneous solids dispersion methods or derivatives thereof can be used to produce the polyurethane dispersions according to the invention. A summary of these methods can be found in Methoden der organischen Chemie (Houben-Weyl, Erweiterungs- und Folgebände zur 4. Auflage, Vol. E20, H. Bartl and J. Falbe, Stuttgart, New York, Thieme 1987, p. 1671–1682). The melt emulsification and acetone methods are preferred. The acetone method is particularly preferred.

Excess isocyanate groups are reacted by reaction with polyfunctional isocyanate-reactive compounds (chain extension). Water or the polyamines already cited under (A4) are preferably used for this purpose, particularly preferably diamines and triamines, hydrazine and the sodium salt of 2-(2-aminoethyl amino)ethane sulfonic acid. Termination with a monoamine or monoalcohol (A3) such as diethylamine, dibutylamine, ethanolamine, N-methyl ethanolamine or N,N-diethanolamine is also possible.

It is also possible for the PU dispersions according to the invention to be modified using polyacrylates. This is achieved by performing an emulsion polymerization of olefinically unsaturated monomers, such as esters of (meth) acrylic acid and alcohols having 1 to 18 C atoms, styrene, vinyl esters or butadiene, in the presence of the polyurethane dispersion, as described for example in DE-A-1 953 348, EP-A-0 167 188, EP-A-0 189 945 and EP-A-0 308 115. The monomers contain one or more olefinic double bonds. The monomers can also contain functional groups such as hydroxyl, epoxy, methylol or acetoacetoxy groups.

The present invention also provides the use of the hydrophilic, aqueous, PU dispersions according to the invention as coating compositions for the production of coated substrates.

The invention also provides coating compositions containing the PU dispersions according to the invention.

In order to use the PU dispersions according to the invention as coating compositions, the polyurethane dispersions according to the invention can be used either alone or in combination with other aqueous binders. Such aqueous binders can be synthesised from polyester, polyacrylate, polyepoxy or polyurethane polymers, for example. A combination with radiation-curable binders, such as are described e.g. in EP-A-0 753 531, is also possible. It is likewise possible for the PU dispersions according to the invention to be blended with other anionic or non-ionic dispersions, such as polyvinyl acetate, polyethylene, polystyrene, polybutadiene, polyvinyl chloride, polyacrylate and copolymer dispersions.

The PU dispersions according to the invention are stable, capable of being stored and shipped, and can be processed at any later date. Depending on the chosen chemical composition and content of urethane groups, coatings with varying properties are obtained. Soft, tacky coatings, thermoplastic and rubbery-elastic products with a wide range of degrees of hardness through to glass-hard thermosets can thus be obtained. The hydrophilicity of the products can likewise vary between certain limits. The elastic products are melt processable at elevated temperatures, for example 100 to 180° C., provided that they are not chemically crosslinked.

Compounds containing oligomeric polysiloxane segments and having at least two groups that are reactive towards isocyanates, with molecular weights from 300 to 6000, preferably from 500 to 1500, can be added to the aqueous PU dispersions according to the invention to modify certain properties of the coatings, such as feel and surface smoothness. Difunctional polysiloxanes with organofunctional terminal groups are preferably used. These compounds contain for example structural units —O—Si—$(R)_2$—, where R represents a $C_1$–$C_4$ alkyl radical or a phenyl radical.

The conventional auxiliary substances and additives used in textile coating technology, such as pigments, flow control agents, UV stabilizers, antioxidants, fillers, plasticisers, carbon black and silica sols, aluminium, clay, asbestos dispersions or thixotropic agents, can also be added to the PU dispersions according to the invention. In this way ready-to-use aqueous coating compositions are obtained that have a virtually unlimited shelf life at room temperature and cure at relatively low temperatures of 120 to 150° C. within 2 to 3 minutes to form coatings with in particular very good wet adhesion properties.

Depending on the desired properties and intended use of the coating compositions according to the invention, up to 70%, relative to total dry solids, of such fillers can be contained in the end product.

Because of their excellent foaming characteristics and good abrasion resistance, scratch resistance, folding endurance and hydrolysis resistance, the PU dispersions according to the invention, in particular those having solids contents greater than 50%, are especially suitable for applications in the area of upholstered furniture, industrial safety and car interior trim, and for the production of very stable thick foam deposits in a single coat, such as can otherwise be achieved only with high solids coating compositions.

The invention therefore provides the use of the PU dispersions according to the invention in the area of upholstered furniture, industrial safety and car interior trim and for the production of thick foam deposits in a single coat.

The invention likewise provides coated substrates comprising a substrate displaying on one side a coating containing the PU dispersions according to the invention.

Suitable substrates are for example woven and nonwoven textiles, leather, paper, hard fibre, straw, papery materials, wood, glass, all types of plastics, ceramics, stone, concrete, bitumen, porcelain, metals or glass fibres. Preferred substrates are flexible substrates, with textiles and leather being particularly preferred.

The PU dispersions according to the invention or the pastes produced from them as coating compositions are applied to a porous substrate that subsequently remains bonded to the end product, such as woven or nonwoven textiles or fibrous mats, felts or bonded fabrics, also paper webs, expanded films or split leathers, the suction from which brings about an immediate solidification of the coating. The coating is then dried at elevated temperature and optionally moulded. However, drying can also be performed on smooth porous or non-porous materials, such as glass, paper, card, ceramic materials, metal, silicone rubber, aluminium foil. The finished flat material is then peeled off and either used as it is or applied to a substrate using the reverse coating method, by gluing, flame lamination or calendering.

The PU dispersions according to the invention can perform various functions, e.g. imparting antistatic and crease-resistant properties, as a binder for bonded fabrics, as adhesives, bonding agents, laminating agents, water repellents, plasticizers, binders, as auxiliary substances in textile printing and in the paper industry, as an additive for polymers, as a size, e.g. for glass fibres and for leather finishing.

The coating composition according to the invention can be applied by spreading it directly onto the substrate using doctor blades, rolls or wire blades. Several layers, but preferably two, are generally applied in succession. The subsequently applied top coat protects the entire composite against mechanical loading and abrasion. Application of the coating composite comprising base coat and top coat can also be performed using the so-called reverse coating method, however. In this method the top coat is first applied to a release backing and dried. After application of a second base coat or anchor coat, the textile substrate is gently pressed into the coat whilst still wet. After it has dried, a permanent composite comprising coating and substrate is formed, which is detached from the release backing and which in terms of its structure largely corresponds to that produced by the direct coating method described above.

The products obtained by various application methods can be dried at room temperature or at elevated temperature. The drying temperature to be chosen in the individual case, which apart from the chemical composition of the material depends primarily on the moisture content, drying time and film thickness, can easily be determined by means of a preliminary test. For a given heating period the drying temperature must always be below the solidification temperature.

The flat material can subsequently be coated with a finish to increase the resistance of its surface. Aqueous dispersions or solutions are preferably also used for this purpose.

EXAMPLES

The properties of PU dispersions for textile coating were determined on free films produced as follows:

In a film casting instrument comprising two polished rolls, which was set to a precise distance, a release paper was inserted in front of the rear roll. The distance between the paper and the front roll was adjusted by means of a feeler gauge. This distance corresponds to the (wet) film thickness of the resulting coating, and was adjusted to the desired deposition for each coat. Coating could also be performed consecutively in several coats.

The individual coats were applied by pouring the products (aqueous formulations were first set to a viscosity of 4500 mPa s by addition of ammonia/polyacrylic acid) onto the gap between the paper and the front roll and pulling the release paper vertically downwards, whereby the corresponding film was formed on the paper. If several coats were to be applied, each individual coat was dried and the paper inserted again.

The modulus at 100% extension was determined according to DIN 53504 on films of thickness >100 μm.

The average particle sizes (the number average is stated) of the PU dispersions were determined using laser correlation spectroscopy (instrument: Malvern Zetasizer 1000, Malvern Instr. Limited).

The stated viscosities are flow times, measured according to DIN 53 211 in 4 mm DIN cups.

Starting Materials Used

| | |
|---|---|
| Diol I: | Polytetramethylene glycol polyol, OH number 112, molecular weight = 1000 g/mol, PolyTHF 1000 (BASF AG, Ludwigshafen) |
| Diol II: | Polytetramethylene glycol polyol, OH number 62, molecular weight = 1800 g/mol, PolyTHF 1800 (BASF AG, Ludwigshafen) |
| Diol III: | Polytetramethylene glycol polyol, OH number 56, molecular weight 2000 g/mol, PolyTHF 2000 (BASF AG, Ludwigshafen) |
| Diol IV: | Polycarbonate based on 1,6-hexanediol, OH number 56, molecular weight 2000 g/mol, Desmophen 2020 (Bayer AG, Leverkusen) |
| Diol V: | Polypropylene oxide polyether, OH number 56, molecular weight 2000 g/mol, Desmophen 3600 (Bayer AG, Leverkusen) |
| Diol VI: | Polypropylene oxide polyether, OH number 200, molecular weight 560 g/mol, Desmophen L400 (Bayer AG, Leverkusen) |

EOX Polyether:
Monofunctional polyethylene glycol, OH number 25, molecular weight 2250 g/mol, Desmophen LB 25 (Bayer AG, Leverkusen)
Diaminosulfonate:
$NH_2-CH_2-CH_2-NH-CH_2-CH_2-SO_3Na$ (45% in water)
Diaminocarboxylate:
$NH_2-CH_2-CH_2-NH-CH_2-CH_2-COOH$ (40% in water), e.g. KV 1386 (BASF AG, Ludwigshafen)
Hydrophilizing Agent:
according to Example 1 in EP-A 916647, page 3.

85.0 g IPDA and 282.0 g water were initially introduced into the reaction vessel at room temperature. 36.0 g acrylic acid was added dropwise to this mixture, while stirring, the mixture warming slightly. When the addition of the acrylic acid has ended, the mixture was subsequently stirred at 45° C. for 1 hour. A clear, colorless dispersing agent solution (30%) with an $NH/NH_2$ equivalent weight of 403 g and an acid equivalent of 806 g was obtained.

PU I:
Anionic/non-ionic aliphatic $C_3$ polyether polycarbonate polyurethane dispersion with a solids content of 40% and the following physical properties: modulus at 100% (DIN 53504)=2.4 MPa, tensile strength (DIN 53504)=25.9 MPa, elongation at break (DIN 53504)=840%, flow time at 23° C. (4 mm cup according to AFAM 2008/105,0304-00 D)=25±15 s, such as Impranil DLV (Bayer AG, Leverkusen).

PU II:
Anionic aliphatic polyester polyurethane dispersion with a solids content of 50% and the following physical properties: modulus at 100% (DIN 53504)=2.1 MPa, tensile strength (DIN 53504)=25.0 MPa, elongation at break (DIN 53504)=600%, flow time at 23° C. (4 mm cup according to AFAM 2008/105,0304-00 D)≦70 s, such as Impranil DLS (Bayer AG, Leverkusen).

PU III:
Anionic aliphatic polyester polyurethane dispersion with a solids content of 40% and the following physical properties: modulus at 100% (DIN 53504)=2.0 MPa, tensile strength (DIN 53504)=20.0 MPa, elongation at break (DIN 53504)=700%, flow time at 23° C. (4 mm cup according to AFAM 2008/105,0304-00 D)≦70 s, such as Impranil DLN (Bayer AG, Leverkusen).

Application Examples

Example 1

| Formualtion: | | |
|---|---|---|
| Part 1: | 203.3 g | diol III |
| | 156.0 g | diol IV |
| | 77.0 g | diol I |
| | 14.6 g | EOX polyether |
| Part 2: | 48.9 g | hexane diisocyanate-1,6 |
| | 64.6 g | isophorone diisocyanate |
| Part 3: | 1016.5 g | acetone |
| Part 4: | 34.7 g | isophorone diamine |
| | 6.9 g | diaminosulfonate |
| | 2.2 g | hydrazine hydrate |
| | 134.4 g | water |
| Part 5: | 298.1 g | water |

Method:
The mixture of part 1, which has been dehydrated at 120° C., was combined with part 2 at 70° C., heated to 90° C. and stirred at 90° C. until a constant NCO value was achieved. The prepolymer was dissolved with part 3 at 60° C. and stirred for 15 min. Part 4 was added at 48° C. over 15 min and stirred for 15 min. Part 5 was added over 10 min, acetone removed by distillation and the solids content adjusted to 60%.

A dispersion with a solids content of 60.4% and a flow viscosity at 23° C. (4 mm cup according to AFAM 2008/105,0304-00 D) of 27 s was obtained.

Example 2

| Formulation: | | |
|---|---|---|
| Part 1: | 400.0 g | diol IV |
| | 260.0 g | diol III |
| | 27.0 g | EOX polyether |
| | 8.6 g | dimethylol propanoic acid |
| Part 2: | 121.0 g | hexane diisocyanate-1,6 |
| Part 3: | 1451.7 g | acetone |
| Part 4: | 5.2 g | 1,2-diaminoethane |
| | 3.0 g | hydrazine hydrate |
| | 24.0 g | diaminocarboxylate |
| | 141.8 g | water |
| Part 5: | 1091.9 g | water |

Method: Same as for Example 1 (Solids Content 40%)

A dispersion with a solids content of 41.0% and a flow viscosity at 23° C. (4 mm cup according to AFAM 200811050304-00 D) of 20 s is obtained.

Example 3

| Formulation: | | |
|---|---|---|
| Part 1: | 311.7 g | diol II |
| | 88.0 g | diol IV |
| | 12.4 g | EOX polyether |
| Part 2: | 41.4 g | hexane diisocyanate-1,6 |
| | 54.7 g | isophorone diisocyanate |
| Part 3: | 903.5 g | acetone |
| Part 4: | 30.2 g | isophorone diamine |
| | 5.22 g | diaminosulfonate |
| | 0.75 g | hydrazine hydrate |
| | 137.8 g | water |
| Part 5: | 249.5 g | water |

Method: Same as for Example 1

A dispersion with a solids content of 59.5% and a flow viscosity at 23° C. (4 mm cup according to AFAM 2008/105,0304-00 D) of 29 s is obtained.

Example 4

| Formulation: | | |
|---|---|---|
| Part 1: | 130.0 g | diol III |
| | 200.0 g | diol IV |
| | 13.5 g | EOX polyether |
| | 4.3 g | dimethylol propanoic acid |
| Part 2: | 60.5 g | hexane diisocyanate-1,6 |
| Part 3: | 725.9 g | acetone |
| Part 4: | 2.6 g | 1,2-ethylene diamine |
| | 25.2 g | hydrophilising agent |
| | 1.5 g | hydrazine hydrate |
| | 1.6 g | potassium hydroxide |
| | 101.1 g | water |
| Part 5: | 512.2 g | water |

Method: Same as for Example 1 (Solids Content 40%)

A dispersion with a solids content of 40.4% and a flow viscosity at 23° C. (4 mm cup according to AFAM 105,0304-00 D) of 15 s is obtained.

Example 5

| Formulation: | | |
|---|---|---|
| Part 1: | 30.0 g | diol III |
| | 200.0 g | diol IV |
| | 13.5 g | EOX polyether |
| | 4.3 g | dimethylol propanoic acid |
| Part 2: | 60.5 g | hexane diisocyanate-1,6 |
| Part 3: | 725.9 g | acetone |
| Part 4: | 2.6 g | 1,2-ethylene diamine |
| | 25.2 g | hydrophilising agent |
| | 1.50 g | hydrazine hydrate |
| | 2.50 g | dimethyl ethanolamine |
| | 109.6 g | water |
| Part 5: | 505.0 g | water |

Method: same as for Example 1 (Solids Content 40%)

A dispersion with a solids content of 40.0% and a flow viscosity at 23° C. (4 mm cup according to AFAM 2008/105,0304-00 D) of 19 s is obtained.

Example 6

| Formulation: | | |
|---|---|---|
| Part 1: | 340.0 g | diol I |
| | 320.0 g | diol IV |
| | 27.0 g | EOX polyether |
| | 8.6 g | dimethylol propanoic acid |
| Part 2: | 149.6 g | hexane diisocyanate-1,6 |
| Part 3: | 1502.6 g | acetone |
| Part 4: | 4.9 g | 1,2-ethylene diamine |
| | 53.6 g | hydrophilising agent |
| | 3.0 g | hydrazine hydrate |
| | 5.3 g | dimethyl ethanolamine |
| | 220.8 g | water |
| Part 5: | 1049.1 g | water |

Method: Same as for Example 1 (Solids Content 40%)

A dispersion with a solids content of 40.3% and a flow viscosity at 23° C. (4 mm cup according to AFAM 2008/105,0304-00 D) of 16 s is obtained.

Comparative Examples

Example 7

| Formulation: | | |
|---|---|---|
| Part 1: | 250.0 g | diol III |
| | 80.0 g | diol V |
| | 13.5 g | EOX polyether |
| | 4.3 g | dimethylol propanoic acid |
| Part 2: | 67.2 g | hexane diisocyanate-1,6 |
| Part 3: | 737.8 g | acetone |
| Part 4: | 4.5 g | 1,2-ethylene diamine |
| | 13.1 g | diaminosulfonate |
| | 2.65 g | hydrazine hydrate |
| | 130.9 g | water |
| Part 5: | 501.6 g | water |

Method: Same as for Example 1 (Solids Content 40%)

A dispersion with a solids content of 40.9% and a flow viscosity at 23° C. (4 mm cup according to AFAM 2008/105,0304-00 D) of 17 s is obtained.

Example 8

| Formulation: | | |
|---|---|---|
| Part 1: | 250.0 g | diol III |
| | 22.0 g | diol VI |
| | 13.5 g | EOX polyether |
| | 4.3 g | dimethylol propanoic acid |
| Part 2: | 60.5 g | hexane diisocyanate-1,6 |
| Part 3: | 622.8 g | acetone |
| Part 4: | 2.6 g | 1,2-ethylene diamine |
| | 13.0 g | diaminosulfonate |
| | 1.50 g | hydrazine hydrate |
| | 87.5 g | water |
| Part 5: | 444.4 g | water |

Method: Same as for Example 1 (Solids Content 40%)

A dispersion with a solids content of 39.0% and a flow viscosity at 23° C. (4 mm cup according to AFAM 2008/105,0304-00 D) of 15 s is obtained.

Test Results for Application Examples 1 to 6 and Comparative Examples 7 and 8 of 70 to max. 100 g were achieved. If these values were exceeded, cracking occured immediately.

The foam produced from the PU dispersion from Example 1 also displayed significantly better scratch and abrasion resistance than the foams made from the conventional PU dispersions (PU II and III) of the prior art.

TABLE 1

Test results for examples 1–6 according to the invention, comparative examples 7 and 8 and PU dispersions PU I and II.

|  | PC polyol content [polymeric PC/PTHF polyol content in wt. %] | Poly THF content [polymeric PC/PTHF polyol content in wt. %] | Modulus at 100% [MPa] | Tensile strength [MPa] | Elongation at break [%] | Tensile strength [MPa] after 10 wks hydrolysis | Elongation at break [%] after 10 wks hydrolysis |
|---|---|---|---|---|---|---|---|
| PU I | Comparative example | | 2.4 | 25.9 | 840 | 16.0 | 710 |
| PU II | Comparative example | | 2.1 | 25.0 | 600 | 14.5 | 380 |
| Example 1 | 35.7 | 64.3 | 2.6 | 27.4 | 730 | 27.0 | 770 |
| Example 2 | 60.6 | 39.4 | 2.4 | 23.5 | 700 | 23.2 | 800 |
| Example 3 | 22.0 | 78.0 | 2.6 | 8.8 | 710 | 7.90 | 680 |
| Example 4 | 60.6 | 39.4 | 2.7 | 26.0 | 810 | 22.1 | 860 |
| Example 5 | 60.6 | 39.4 | 2.8 | 19.8 | 720 | 20.3 | 870 |
| Example 6 | 48.5 | 51.5 | 2.5 | 23.3 | 670 | 21.2 | 570 |
| Example 7 | Comparative example | | 2.3 | 16.2 | 1100 | Melted after 8 weeks | |
| Example 8 | Comparative example | | 2.1 | 16.0 | 980 | Melted after 6 weeks | |

The PU dispersions according to the invention from example 1–6 displayed substantially better hydrolysis resistances than the PU dispersions from the prior art (PU I/II) and the comparative examples 7 and 8.

Example 9

Use of the PU Dispersions According to the Invention for the Production of Foams Starting formulation for fogging-free mechanically blown foams up to a density of 0.4 kg/dm³:

| PU dispersion from example | 11000 g |
| Isoversal WL pigments (ISL Chemie) | 30–100 g |
| Levapon TH | 5 g |
| Stokal SR (Stockhausen) | 10 g |
| Mirox AM (Stockhausen) | 20 g |
| Ammonia solution, conc. | 5 g |
| Acrafix ML | 10 g |

The mechanically blown foam was produced using commercial foaming units, e.g. Hansa Mix.

Expandable pastes produced from Example 1 by this method of operation were applied in a single coat to produce foams with a film thickness of at least 2.0–2.5 mm, in other words producing solids deposits of almost 800 g/m² and more, depending on the efficiency of the drying unit. Foams produced from PU II under identical conditions produce foam deposits of around 200–250 g/m², in other words a film thickness of 0.6–0.8 mm. Thicker deposits lead to deep cracks in the surface of the foam.

If PU III was used in place of the PU dispersion from Example 1, foam layers of 0.3–0.4 mm with solids deposits Example 10

Use of the PU Dispersions According to the Invention as Coating Compositions for Leather Materials and Formulations Used A) Binders
1) Anionic aliphatic linear PU dispersion with isophorone diisocyanate/butanediol rigid segments, polypropylene oxide soft segments and carboxyl hydrophilization; solids content 37%; with the following properties: Shore-A=85; modulus at 100%=18 MPa; tensile strength=30 MPa; elongation at break=400%.
2) Anionic aliphatic branched PU dispersion with polyester soft segments, carbazide rigid segments and sulfonate hydrophilization; solids content 40% with the following properties: Shore-A hardness=95; modulus at 100%=20 MPa; tensile strength=40 MPa; elongation at break=300%.
3) Anionic aliphatic linear PU dispersion with polycarbonate soft segments, carbazide and polyurea rigid segments and synergistic polyether/sulfonate/carboxyl hydrophilization; solids content 40% with the following properties: Shore-A hardness=85; modulus at 100%=4.1 MPa; tensile strength=43 MPa; elongation at break=530%.
4) PU dispersion according to the invention (Example 1)
5) Commercial blend of an aliphatic polyurethane with an acrylate; solids content 49% with the following properties: modulus at 100%=2.2 MPa; tensile strength= 11.5 MPa; elongation at break=670%.

B) NCO prepolymer:
80% solution of a prepolymer in ethyl acetate, produced from a trifunctional polyether (MN=4800); a linear polyadipate (MN=1700) and a diphenyl methanediisocyanate isomer mixture. The NCO content of the product is 3.6%.

C) Hardener for the prepolymer

Formulation of an aliphatic diamine with auxiliary substances and additives in butanone; 400 g of the formulation correspond to 1 gram equivalent of $NH_2$.

D) Other components:

a) Formulation of a hydrophilic HDI trimer in propylene glycol diacetate; content of active ingredient 50%; NCO content 8.6%; crosslinking agent for aqueous binders b) Aqueous carbon black preparation; carbon black content 14%.

c) Water-miscible formulation of an associative PU thickener; content of active ingredient 8%.

d) Water-dispersible silicone formulation; stiffening agent.

e) Water-soluble polyether trisiloxane; flow control agent.

Coating of Leather

Production of Coating on the Release Backing

Top Coat

A blend was produced from 330 parts PU 1; 330 parts PU 2; 330 parts PU 3; 20 parts silicone d; 40 parts carbon black preparation (b); 20 parts siloxane (e) and 60 parts PU thickener (c). This blend was spread onto a commercial release paper (ULTRACAST Soave) on an industrial coating plant in such a way (nip 0.08 mm) that a solids deposition of 25 g per square meter was obtained. The coating was dried within 5 min (temperature programme 80–1 50° C.).

Intermediate Coat

A mixture comprising 1000 parts of binder 4 according to the invention; 40 parts carbon black preparation (b); 15 parts siloxane (e) and 80 parts thickener (c) was produced. This mixture was spread onto the dried top coat in such a way that a solids deposition of 45 g per square meter was obtained (nip 0.12 mm). The intermediate coat was dried in the same way as the top coat.

A release backing provided with a top coat and intermediate coat was obtained in this way. The coating was then bonded with split leather in two different ways. After bonding the release paper was removed and the resulting coated leather was assessed and tested for physical resistance properties.

A) Aqueous Bonding

A mixture comprising 1000 parts of blend 5; 50 parts crosslinking agent (a) and 60 parts thickener (c) was produced. This mixture was spread onto the release paper provided with top coat and intermediate coat in such a way that a solids deposition of 50 g per square meter is obtained (nip 0.18 mm). The adhesive layer was only gently dried using a temperature programme of 80–105° C. so that it was still tacky when it emerges from the drying tunnel. A piece of split leather was placed onto this adhesive layer and pressed down with a roller using moderate pressure. After 15 min the release paper was then removed (leather A).

B) Organic Bonding

In an industrial 2-component spraying unit a mixture comprising prepolymer C and hardener D with a mixing ratio of 1000:318 was sprayed onto the release backing provided with top coat and intermediate coat in such a way that a solids deposition of 100 g per square meter was obtained. A piece of split leather was placed into the reacting compound and pressed down with a roller using moderate pressure. It was then dried for 5 min at 80° C. and the release paper removed (leather B).

Both leather A and leather B were characterised by good body and coverage of the coating. They were both extremely close-grained.

The physical resistance properties of the two leathers were as follows:

| | |
|---|---|
| Dry folding endurance: | 100,000 folds without damage |
| Wet folding endurance: | 100,000 folds without damage |
| Folding endurance at $-25°$ C.: | 30,000 folds without damage |
| Adhesion of the coating: | dry > 20 N/cm (leather A + B); wet 9 N/cm (leather A); >5 N/cm (leather B) |

After being stored for 7 days at 70° C. and 95% relative humidity, the appearance of both coated leathers remained unchanged; the folding endurance test (dry folding) after this ageing test produced the following results:

Leather A: 100,000 folds with very slight damage;
Leather B: 100,000 folds without damage.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An ionic and/or non-ionic hydrophilic, aqueous polyurethane (PU) dispersion comprising

| | |
|---|---|
| A1 | a polyisocyanate, |
| A2 | a mixture of a polycarbonate and a polymethylene glycol polyol, |
| A3 | optionally a momoslcohol or a monoamine, |
| A4 | a polyol, an amino polyol or a polyamine, |
| A5 | optionally a polyoxyalkylene ether with at least one hydroxyl or amino group, and |
| A6 | optionally an antioxidant and/or a light stabilizer and/or another auxiliary substances and/or an additive. |

2. The polyurethane dispersion of claim 1 comprising

| | |
|---|---|
| A1 | 5 to 30 wt. %, |
| A2 | 55 to 87 wt. %, |
| A3 | 0 to 10 wt. %, |
| A4 | 1 to 20 wt. %, |
| A5 | 0 to 10 wt. %, |
| A6 | 0 to 10 wt. %, | whereby the sum of the percentages by weight of components A1 to A6 is 100%.

3. The polyurethane dispersion of claim 1 comprising

| | |
|---|---|
| A1 | 10 to 25 wt. %, |
| A2 | 60 to 85 wt. %, |
| A3 | 0 to 10 wt. %, |
| A4 | 1 to 15 wt. %, |
| A5 | 1 to 10 wt. %, |
| A6 | 0.5 to 8 wt. %, | whereby the sum of the percentages by weight of components A1 to A6 is 100%.

4. The polyurethane dispersion of claim 1 comprising

| | |
|---|---|
| A1 | 13 to 20 wt. %, |
| A2 | 70 to 82 wt. %, |
| A3 | 0 to 10 wt. %, |
| A4 | 1 to 10 wt. %, |
| A5 | 1 to 5 wt. %, |
| A6 | 1 to 6 wt. %, | whereby the sum of the percentages by weight of components A1 to A6 is 100%.

5. The polyurethane dispersion of claim 1 wherein the mixture A2 comprises between 20 and 80 wt. % of the polycarbonate polyol, and between 20 and 80 wt. % of the polytetramethylene glycol polyol, and the sum of the percentages by weight of polycarbonate and polytetramethylene glycol polyols is 100%, based on A2.

6. The polyurethane dispersion of claim 5 wherein the mixture A2 comprises between 25 and 70 wt. % of the polycarbonate polyol, and between 30 and 75 wt. % of the polytetramethylene glycol polyol, and the sum of the percentages by weight of polycarbonate and polytetramethylene glycol polyols is 100%, based on A2.

7. The polyurethane dispersion of claim 5 wherein the mixture A2 comprises between 30 and 65 wt. % of the polycarbonate polyol, and between 35 and 7 wt. % of the polytetramethylene glycol polyol, and the sum of the percentages by weight of polycarbonate and polytetramethylene glycol polyols is 100%, based on A2.

8. A process for the production of the PU dispersions according to claim 1 comprising first reacting the components A1 and A2 and optionally components A3 to A6 to form a polyurethane prepolymer, and then dispersing the polyurethane prepolymer in or by addition of water.

9. The process of claim 8 further comprising reacting the dispersed polyurethane prepolymer with the components A3 to A6.

10. An article of manufacture comprising a substrate coated with the polyurethane dispersion of claim 1.

11. The article of manufacture of claim 10 wherein the substrate is a textile or leather.

12. The article of manufacture of claim 10 wherein the substrate is upholstered furniture or an interior trim of a car.

13. The article of manufacture of claim 10 wherein the substrate comprises a thick foam deposit in a single coat.

14. The article of manufacture of claim 10 wherein the substrate comprises on one side a coating containing the polyurethane dispersion of claim 1.

15. A coating composition comprising the polyurethane dispersion of claim 1.

* * * * *